(12) United States Patent
Svec (10) Patent No.: US 12,546,113 B2
(45) Date of Patent: Feb. 10, 2026

(54) ROOFING SHINGLE AND METHOD OF MANUFACTURING THEREOF

(71) Applicant: BMIC LLC, Dallas, TX (US)

(72) Inventor: James A. Svec, Kearny, NJ (US)

(73) Assignee: BMIC LLC, Dallas, TX (US)

( * ) Notice: Subject to any disclaimer, the term of this patent is extended or adjusted under 35 U.S.C. 154(b) by 172 days.

(21) Appl. No.: 18/361,327

(22) Filed: Jul. 28, 2023

(65) Prior Publication Data

US 2024/0026684 A1    Jan. 25, 2024

Related U.S. Application Data

(63) Continuation of application No. 17/525,591, filed on Nov. 12, 2021, now Pat. No. 11,828,065.

(60) Provisional application No. 63/113,618, filed on Nov. 13, 2020.

(51) Int. Cl.
| | |
|---|---|
| *E04D 1/28* | (2006.01) |
| *B32B 3/30* | (2006.01) |
| *B32B 7/05* | (2019.01) |
| *B32B 7/12* | (2006.01) |
| *E04D 1/26* | (2006.01) |

(52) U.S. Cl.
CPC .................. *E04D 1/28* (2013.01); *B32B 3/30* (2013.01); *B32B 7/05* (2019.01); *B32B 7/12* (2013.01); *E04D 1/26* (2013.01); *B32B 2419/06* (2013.01)

(58) Field of Classification Search
CPC ................ E04D 1/26; E04D 2001/005; E04D 2001/3423; E04D 1/28; B32B 7/05; B32B 3/30; B32B 7/12
See application file for complete search history.

(56) References Cited

U.S. PATENT DOCUMENTS

| | | | |
|---|---|---|---|
| 1,542,475 A | * | 6/1925 | Ruess ....................... E04D 1/26 |
| | | | 428/168 |
| 1,765,796 A | | 6/1930 | Kirschbraun |
| 1,998,590 A | | 4/1935 | Randall |
| 2,232,786 A | | 2/1941 | Kendall |
| 3,197,355 A | | 7/1965 | Copeland |
| 3,256,131 A | | 6/1966 | Koch et al. |
| 4,102,107 A | | 7/1978 | Barker et al. |
| 4,148,168 A | | 4/1979 | Diamond |
| 4,466,226 A | | 8/1984 | Rohner |
| 4,671,037 A | | 6/1987 | Bienvenu |

(Continued)

FOREIGN PATENT DOCUMENTS

KR    2002048786 A    6/2002

*Primary Examiner* — Brian E Glessner
*Assistant Examiner* — Daniel J Kenny
(74) *Attorney, Agent, or Firm* — GREENBERG TRAURIG, LLP (57) ABSTRACT

An article includes a first layer including a front surface and a back surface and a second layer including a front surface and a back surface. A portion of the second layer overlaps the first layer. A portion of the second layer is fastened to the first layer. The back surface of the first layer contacts the front surface of the second layer. A plurality of indentations along a major dimension of the roofing shingle. The plurality of indentations are configured to partially press the second layer into the first layer such that the second layer is partially indented into the first layer. The plurality of indentations are at least one of barrel-shaped, flattened teardrop shaped, rounded taper teardrop shaped, or combinations thereof.

20 Claims, 10 Drawing Sheets

(56) References Cited

U.S. PATENT DOCUMENTS

| | | | |
|---|---|---|---|
| 4,798,754 A | 1/1989 | Tomek | |
| 5,232,530 A | 8/1993 | Malmquist et al. | |
| 5,305,569 A | 4/1994 | Malmquist et al. | |
| 5,421,134 A | 6/1995 | Hannah et al. | |
| 5,666,776 A | 9/1997 | Weaver et al. | |
| 5,671,577 A | 9/1997 | Todd | |
| 5,822,943 A | 10/1998 | Frankoski et al. | |
| 5,950,387 A | 9/1999 | Stahl et al. | |
| 5,956,913 A | 9/1999 | Nicholson | |
| 6,014,847 A | 1/2000 | Phillips | |
| 6,083,592 A | 7/2000 | Chich | |
| 6,145,265 A | 11/2000 | Malarkey et al. | |
| 6,289,648 B1 | 9/2001 | Freshwater et al. | |
| 6,397,546 B1 | 6/2002 | Malarkey et al. | |
| 6,470,642 B1 | 10/2002 | Eads | |
| 6,471,812 B1 | 10/2002 | Thomson et al. | |
| 6,510,664 B2 | 1/2003 | Kupczyk | |
| 6,679,020 B2 | 1/2004 | Becker et al. | |
| 6,968,662 B2 | 11/2005 | Rodrigues | |
| 7,836,654 B2 | 11/2010 | Belt et al. | |
| 8,006,457 B2 * | 8/2011 | Binkley | E04D 1/26 52/557 |
| 8,127,514 B2 | 3/2012 | Binkley et al. | |
| 8,156,704 B2 | 4/2012 | Belt et al. | |
| 8,181,413 B2 | 5/2012 | Belt et al. | |
| 8,240,102 B2 | 8/2012 | Belt et al. | |
| 8,297,020 B1 | 10/2012 | Swanson | |
| 8,535,786 B2 | 9/2013 | Schroeer et al. | |
| 8,607,521 B2 | 12/2013 | Belt et al. | |
| 8,623,164 B2 | 1/2014 | Belt et al. | |
| 8,752,351 B2 | 6/2014 | Belt et al. | |
| 8,984,835 B2 * | 3/2015 | Kalkanoglu | B32B 38/10 52/557 |
| 11,352,792 B2 | 6/2022 | Boss et al. | |
| 2004/0079042 A1 | 4/2004 | Elliott | |
| 2004/0206035 A1 | 10/2004 | Kandalgaonkar | |
| 2004/0258883 A1 | 12/2004 | Weaver | |
| 2011/0072752 A1 * | 3/2011 | Aschenbeck | B32B 11/02 53/446 |
| 2011/0283646 A1 * | 11/2011 | Vermilion | E04D 1/26 52/539 |
| 2012/0047838 A1 | 3/2012 | Kalkanoglu et al. | |
| 2013/0025225 A1 | 1/2013 | Vermilion et al. | |
| 2014/0260078 A1 | 9/2014 | Bryson et al. | |
| 2020/0040582 A1 | 2/2020 | Boss et al. | |

* cited by examiner

ROOFING SHINGLE AND METHOD OF MANUFACTURING THEREOF

CROSS-REFERENCE TO RELATED APPLICATIONS

The present application is a continuation of U.S. patent application Ser. No. 17/525,591, filed on Nov. 12, 2021, and entitled "ROOFING SHINGLE AND METHOD OF MANUFACTURING THEREOF," which claims priority to and benefit of U.S. Provisional Patent Application No. 63/113,618, filed on Nov. 13, 2020, and entitled "ROOFING SHINGLE AND METHOD OF MANUFACTURING THEREOF," the entirety of which are hereby incorporated by reference.

FIELD

At least some embodiments disclosed herein relate generally to roofing shingles. More particularly, at least some embodiments disclosed herein relate to roofing shingles and methods for manufacturing roofing shingles.

BACKGROUND

Roofing shingles can be multilayer shingles having two or more layers. The layers of the multilayer shingle may be attached to one another by various methods. For example, they may be attached mechanically, with an adhesive, or by a combination of mechanically and with an adhesive.

SUMMARY

In some embodiments, a roofing shingle includes a first layer including a front surface and a back surface. In some embodiments, the roofing shingle includes a second layer including a front surface and a back surface. In some embodiments, a portion of the second layer overlaps the first layer. In some embodiments, a portion of the second layer is fastened to the first layer. In some embodiments, the back surface of the first layer contacts the front surface of the second layer. In some embodiments, a plurality of indentations are formed along a major dimension of the roofing shingle. In some embodiments, the plurality of indentations are configured to partially press the second layer into the first layer such that the second layer is partially indented into the first layer. In some embodiments, the plurality of indentations are at least one of barrel-shaped, flattened teardrop shaped, rounded taper teardrop shaped, or combinations thereof.

In some embodiments, the first layer is a dragon tooth layer, and the second layer is a backer layer.

In some embodiments, an adhesive is disposed between the first layer and the second layer.

In some embodiments, the plurality of indentations have a depth of 0.05 to 0.2 inches.

In some embodiments, the plurality of indentations include the flattened teardrop shape and have a depth of 0.1 inches.

In some embodiments, the plurality of indentations include the rounded taper teardrop shape and have a depth of 0.1 inches.

In some embodiments, the first layer includes a fines stripe disposed on the front surface of the first layer.

In some embodiments, the plurality of indentations are aligned along the major dimension of the roofing shingle.

In some embodiments, the plurality of indentations are oriented along a minor dimension of the article.

In some embodiments, the plurality of indentations taper such that the plurality of indentations are narrower at an edge of the second layer.

In some embodiments, the plurality of indentations extend along an entire length of the area where the first layer overlaps the second layer.

In some embodiments, a method includes aligning a first layer of a roofing shingle with a second layer of the roofing shingle. In some embodiments, the first layer includes a front surface and a back surface. In some embodiments, the second layer includes a front surface and a back surface. In some embodiments, the front surface of the second layer contacts the back surface of the first layer. In some embodiments, the method includes indenting the second layer into the first layer sufficiently to fasten the second layer to the first layer. In some embodiments, the indenting includes forming a plurality of indentations that are at least one of barrel-shaped, flattened teardrop shaped, rounded taper teardrop shaped, or combinations thereof.

In some embodiments, the indenting the second layer into the first layer includes indenting along a major dimension of the second layer.

In some embodiments, the method includes applying an adhesive to one of the back surface of the first layer or the front surface of the second layer.

In some embodiments, the applying the adhesive is prior to the aligning the first layer and the second layer.

In some embodiments, the indenting includes rolling a wheel across the back surface of the second layer. In some embodiments, the wheel includes a plurality of punches.

In some embodiments, the method includes applying a fines stripe on the front surface of the first layer.

In some embodiments, the plurality of indentations are aligned along a major dimension of the roofing shingle.

In some embodiments, the plurality of indentations are oriented along a minor dimension of the roofing shingle.

In some embodiments, the indenting the second layer does not pierce through the front surface of the first layer.

In some embodiments, an article includes a first layer including a front surface and a back surface and a second layer including a front surface and a back surface. A portion of the second layer overlaps the first layer. A portion of the second layer is fastened to the first layer. The back surface of the first layer contacts the front surface of the second layer. A plurality of indentations along a major dimension of the article are configured to partially press the second layer into the first layer such that the second layer is partially indented into the first layer. The plurality of indentations are at least one of barrel-shaped, flattened teardrop shaped, rounded taper teardrop shaped, or combinations thereof.

In some embodiments, the article is a roofing shingle. In some embodiments, the roofing shingle is a multilayered roofing shingle.

In some embodiments, the first layer is a dragon tooth layer and the second layer is a backer layer.

In some embodiments, an adhesive is disposed between the first layer and the second layer.

In some embodiments, a method includes aligning a first layer of an article with a second layer of the article. The first layer includes a front surface and a back surface. The second layer includes a front surface and a back surface. The front surface of the second layer contacts the back surface of the first layer. The method includes indenting the second layer into the first layer sufficiently to fasten the second layer to the first layer. The indenting includes forming a plurality of indentations that are at least one of barrel-shaped, flattened teardrop shaped, rounded taper teardrop shaped, or combinations thereof.

In some embodiments, the method includes applying an adhesive to one of the back surface of the first layer or the front surface of the second layer.

In some embodiments, the indenting includes rolling a wheel having a plurality of punches across the back surface of the second layer.

In some embodiments, the indenting the second layer into the first layer does not pierce through the front surface of the first layer.

BRIEF DESCRIPTION OF THE DRAWINGS

Reference is made to the drawings that form a part of this disclosure, and which illustrate the embodiments in which the devices and methods described herein can be practiced.

Like reference numbers represent the same or similar parts throughout.

DETAILED DESCRIPTION

An article, such as a multilayered roofing shingle, can be formed of multiple layers fastened together using a series of indentations. When handled (e.g., during transport/delivery or the like), such multilayered roofing shingles can develop small, benign cracks at an edge of a layer where the layer is fastened to another layer.

Embodiments of this disclosure can reduce stresses around an indentation fastening the two layers together. In some embodiments, the layers can be fastened by an indentation punch in which one layer of the shingle is partially pressed into the other layer. In some embodiments, the indentations are made on the back side of the laminated shingle such that the back layer is partially indented into the front layer. In some embodiments, the indentations are made in an area where laminating adhesive is applied in the common bond area. In such embodiments, the indentations can be made after application of the laminating adhesive.

Embodiments of this disclosure further include an elongated and tapered punch (e.g., toward the edge of the back layer (e.g., the backer layer)), which creates an indentation that tapers out to the edge of the back layer and reduces or eliminates the edge stress of a single round punch. The indentations extend to the edge of the back layer. In some embodiments, the punch can be barrel-shaped, flattened teardrop shaped, rounded taper teardrop shaped, or combinations thereof. The punches provide a more visible punch and a stress relieving function toward the edge of the back layer.

Figure 1A:
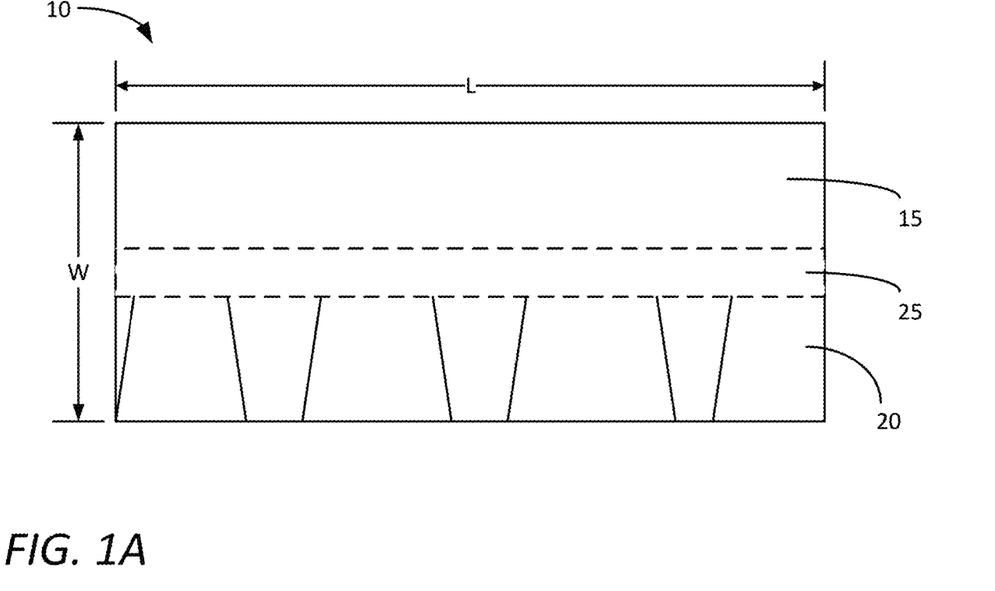
FIG. 1A shows a front view of an article, according to some embodiments.
Figure 1B:
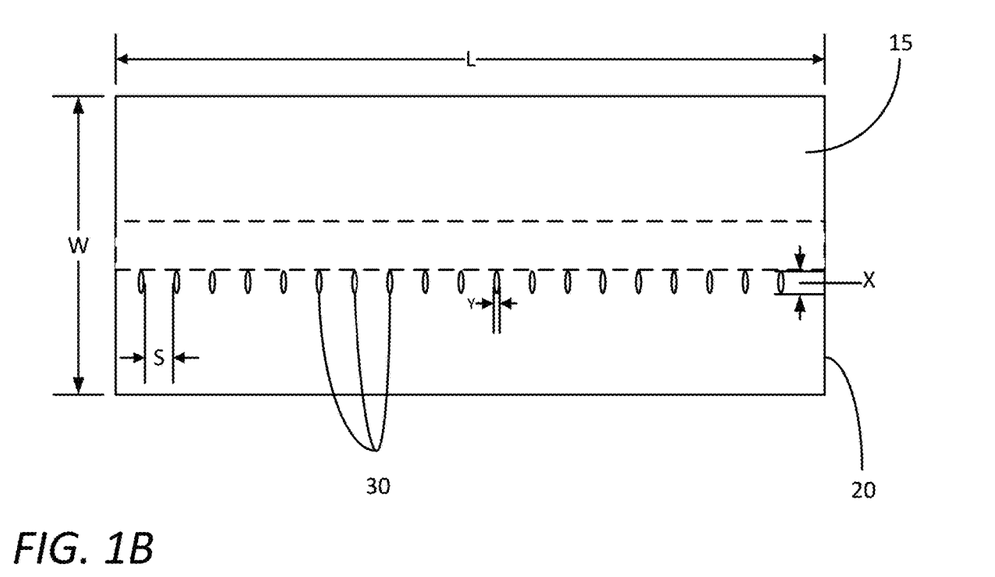
FIG. 1B shows a rear view of the article in FIG. 1A, according to some embodiments.
Figure 1C:
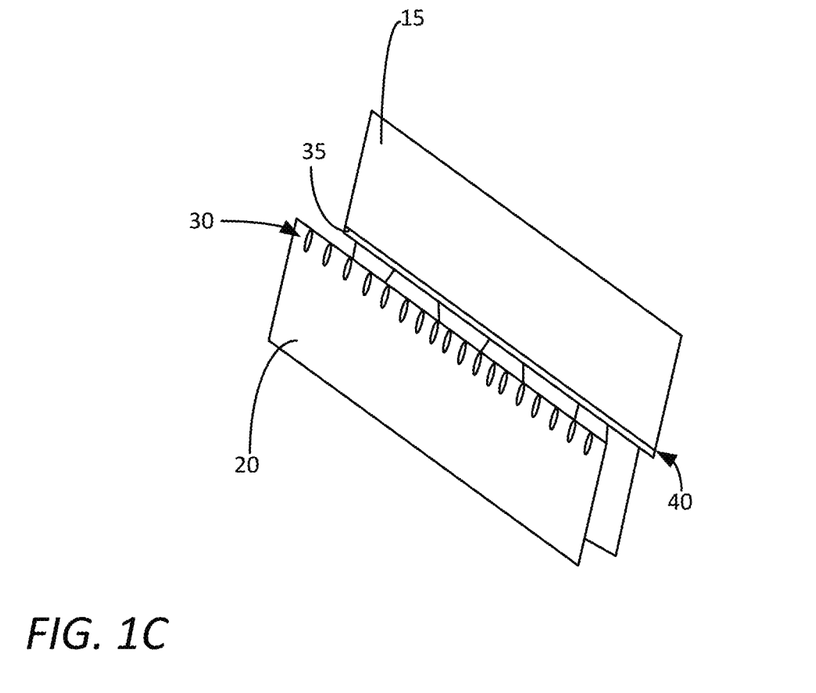
FIG. 1C shows an exploded perspective view of the article in FIGS. 1A, 1B, according to some embodiments.

FIG. 1A shows a front view of an article 10, according to some embodiments. FIG. 1B shows a rear view of the article 10 in FIG. 1A, according to some embodiments. FIG. 1C shows an exploded perspective view of the article 10 in FIGS. 1A, 1B, according to some embodiments.

Collectively, FIGS. 1A-1C show the article 10, according to some embodiments. In some embodiments, the article 10 is a roofing shingle. In some embodiments, the article 10 is a multilayered roofing shingle. The illustrated article 10 is a two-layered roofing shingle. It is to be appreciated that the article 10 can be a multilayered roofing shingle that includes more than two layers.

Referring to FIG. 1A, the article 10 includes a first layer 15 and a second layer 20. The first layer 15 can be referred to as the top layer 15 and the second layer 20 can be referred to as the bottom layer 20. In some embodiments, the first layer 15 can be a dragon tooth layer. In some embodiments, the second layer 20 can be a backer layer.

The article 10 can include a fines stripe 25, a paint line, or combination thereof, on the first layer 15. In some embodiments, the fines stripe 25 can mark an area of the article 10 which an installer (e.g., a roofer or the like) nails the article 10 to a roof of a building when installing.

Referring to FIG. 1B, the article 10 includes a plurality of indentations 30. The plurality of indentations 30 are spaced from one another and extend along a major dimension L of the article 10. In some embodiments, the plurality of indentations 30 extend along the entire major dimension L of the article 10. In some embodiments, the plurality of indentations 30 can be aligned such that a feature (e.g., an extent of the plurality of indentations 30, a center of the plurality of indentations 30, or the like) is colinear along the major dimension L. A number and spacing S of the plurality of indentations 30 can vary. In some embodiments, the spacing S can be from at or about 0.1 inches to at or about 5 inches. In some embodiments, the spacing S can be from at or about 0.25 inches to at or about 2.5 inches. In some embodiments, the spacing S can be from at or about 0.5 inches to at or about 2 inches. In some embodiments, the spacing S can be at or about 1 inches.

The indentations 30 are shown in FIG. 1C. However, it is to be appreciated that this is for illustrative purposes only and that the indentations 30 are present when the first layer 15 and the second layer 20 are joined together. Moreover, the indentations 30 would also be formed into the first layer 15, though not visible in FIG. 1C for simplicity of the figures. Examples are shown and described relative to FIGS. 3A-8 below.

The plurality of indentations 30 can be oriented such that a major dimension X of the indentations is parallel to a minor dimension W of the article 10. In some embodiments, the major dimension X can be from at or about 0.1 inches to at or about 1 inch.

The plurality of indentations 30 can have a minor dimension Y. In some embodiments, the minor dimension Y can be from at or about 0.05 inches to at or about 0.15 inches.

The plurality of indentations 30 can partially press the second layer 20 into the first layer 15 such that the second layer 20 is partially indented into the first layer 15. This is shown and described in additional detail in accordance with FIGS. 3A-8 below. The plurality of indentations 30 do not pierce through the front surface of the first layer 15.

The plurality of indentations 30 can have a barrel shape (FIGS. 3A, 3B below), a flattened teardrop shape (FIGS. 5A, 5B below), a rounded taper teardrop shape (FIGS. 7A, 7B below), or combinations thereof. In some embodiments, the plurality of indentations 30 are the same shape. In some embodiments, the plurality of indentations 30 can have different shapes. Generally, it may be simpler to manufacture the article 10 when the plurality of indentations 30 are the same along the major dimension L of the article 10.

The plurality of indentations 30 can secure the second layer 20 to the first layer 15. That is, in some embodiments, the plurality of indentations 30 can secure the second layer 20 to the first layer 15 without additional securements such as, but not limited to, adhesives or fasteners. In some embodiments, the article 10 can include a layer of an adhesive 35 (FIG. 1C) applied between the first layer 15 and the second layer 20. In such embodiments, the first layer 15 and the second layer 20 can be held together by a combination including the plurality of indentations 30 and the adhesive 35.

In some embodiments, the plurality of indentations 30 can have a depth of at or about 0.05 to at or about 0.2 inches. In some embodiments, the plurality of indentations 30 can have a depth of at or about 0.1 inches. As used herein, "at or about" can be subject to, for example, manufacturing tolerances or the like. In some embodiments, the plurality of indentations 30 are flattened teardrop shaped and have a depth of at or about 0.1 inches. In some embodiments, the plurality of indentations 30 are rounded taper teardrop shaped and have a depth of at or about 0.1 inches.

A portion of the first layer 15 overlaps the second layer 20. The portion can be referred to as the common bond area 40. In some embodiments, the plurality of indentations 30 are formed within the common bond area 40. Similarly, when an adhesive is present, the adhesive is included in the common bond area 40 between the first layer 15 and the second layer 20.

Figure 2:
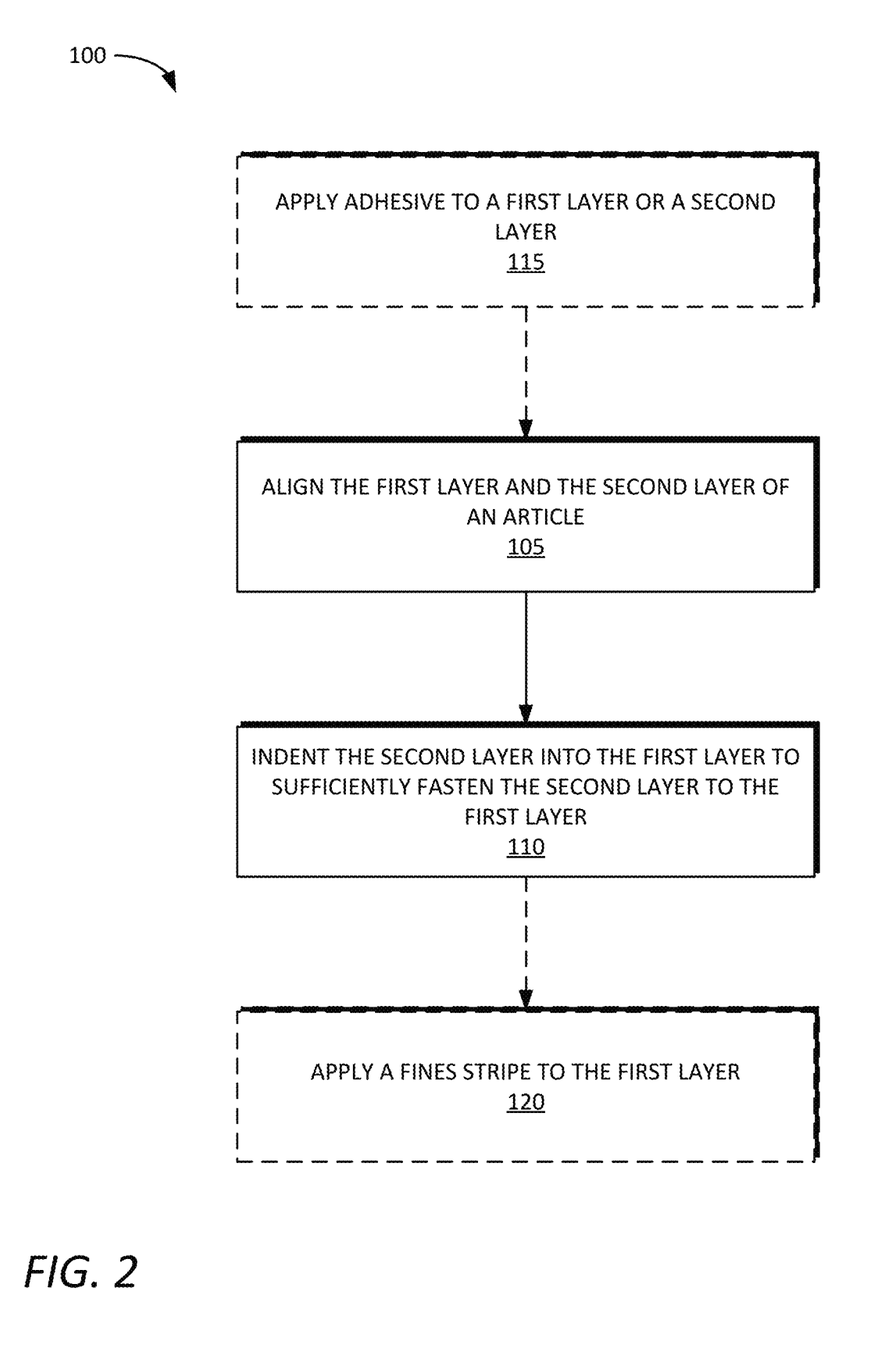
FIG. 2 shows a flowchart for a method, according to some embodiments.

FIG. 2 shows a flowchart for a method 100, according to some embodiments. The method 100 can generally be performed to manufacture an article such as the article 10 (FIGS. 1A-1C). In some embodiments, the method 100 is performed to secure layers of a roofing shingle together to form a multilayer roofing shingle. In some embodiments, the method 100 can be used to manufacture the roofing shingles shown and described in accordance with FIGS. 3A, 3B, 5A, 5B, 7A, and 7B below.

At block 105, the method 100 includes aligning a first layer (e.g., the first layer 15 of FIGS. 1A-1C) of an article (e.g., the article 10 of FIGS. 1A-1C) with a second layer (e.g., the second layer 20 of FIGS. 1A-1C) of the article. The first layer includes a front surface and a back surface. The second layer includes a front surface and a back surface. The front surface of the second layer contacts the back surface of the first layer when aligned. In some embodiments, an adhesive layer can be disposed between the front surface of the second layer and the back surface of the first layer.

At block 110, the method 100 includes indenting the second layer into the first layer sufficiently to fasten the second layer to the first layer. The indenting includes forming a plurality of indentations that are at least one of barrel-shaped, flattened teardrop shaped, rounded taper teardrop shaped, or combinations thereof. In some embodiments, the method 100 includes indenting the second layer into the first layer along an entire major dimension (e.g., major dimension L in FIGS. 1A, 1B) of the article. In some embodiments, block 110 includes rolling a wheel (e.g., the wheel 450 of FIG. 9) across a the major dimension of the article.

In some embodiments, an adhesive can optionally be applied prior to block 110. In such embodiments, the adhesive can be applied prior to block 105 (e.g., at block 115) in some embodiments. When the adhesive is present, the adhesive can be applied to the front surface of the second layer or to the back surface of the first layer.

In some embodiments, a fines stripe can be applied at block 120 onto a front surface of the first layer.

Figure 3A:
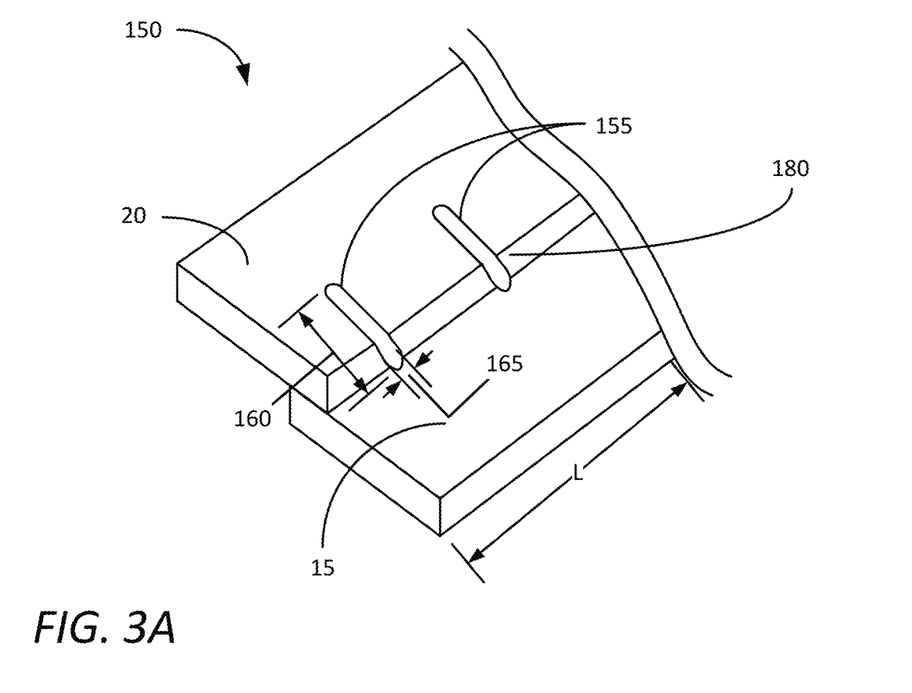
FIG. 3A shows a portion of a roofing shingle, according to some embodiments.
Figure 3B:
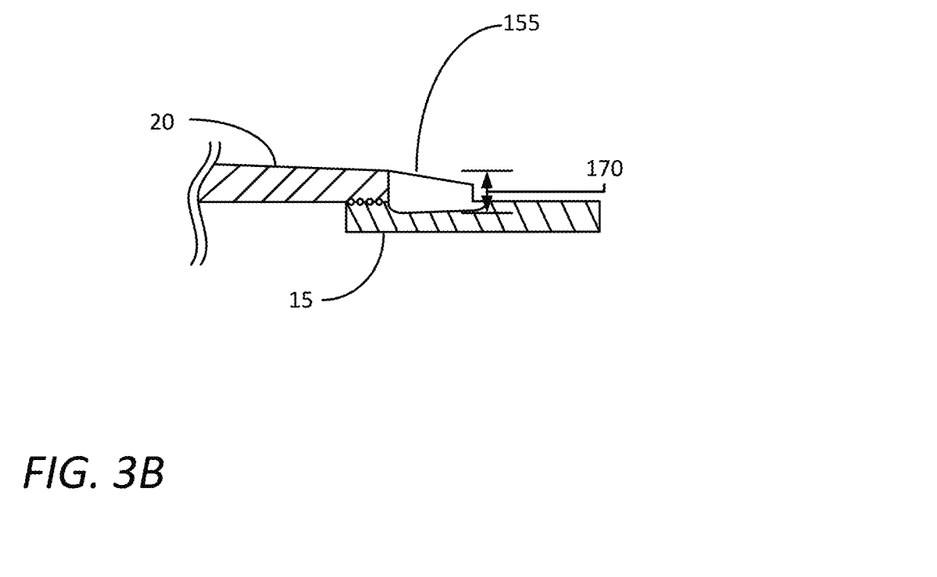
FIG. 3B shows a sectional view of the roofing shingle of FIG. 3A, according to some embodiments.

FIG. 3A shows a roofing shingle 150, according to some embodiments. FIG. 3B shows a sectional view of the roofing shingle 150, according to some embodiments. FIGS. 3A-3B will be discussed generally, unless specific reference is made otherwise.

The roofing shingle 150 includes a plurality of barrel-shaped indentations 155. The plurality of barrel-shaped indentations 155 are spaced along the major dimension L of the roofing shingle 150. The roofing shingle 150 includes the first layer 15 and the second layer 20. The plurality of barrel-shaped indentations 155 have a length 160 and a width 165. A depth 170 is such that a portion of the second layer 20 is indented into the first layer 15, without piercing through the first layer 15. In the illustrated embodiment, the plurality of barrel-shaped indentations 155 are adjacent to an edge 180 of the second layer 20.

Figure 4:
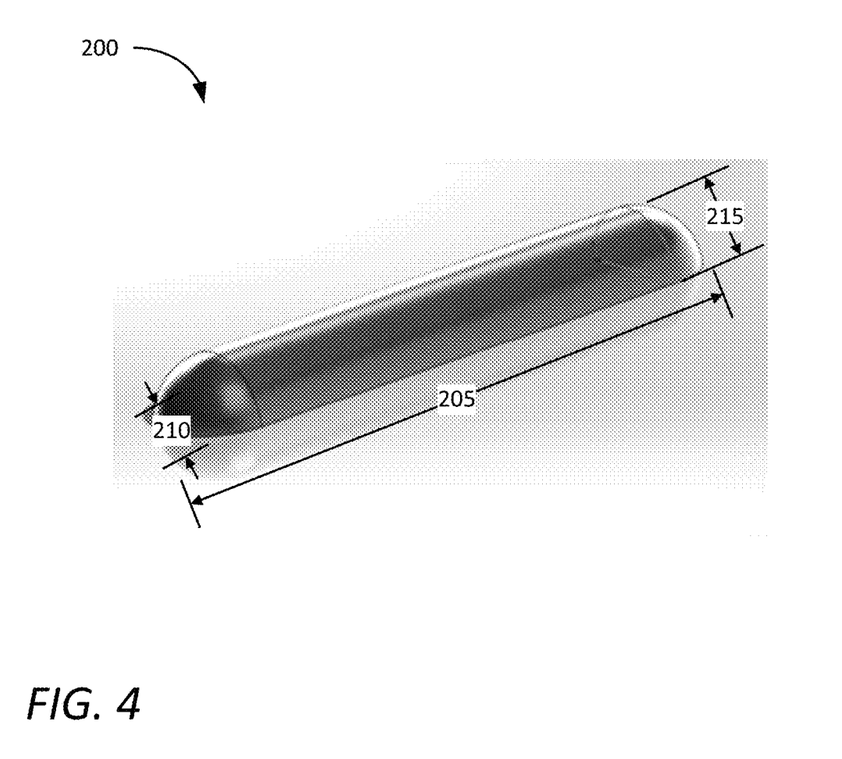
FIG. 4 shows a punch for manufacturing the roofing shingle of FIGS. 3A, 3B, according to some embodiments.

FIG. 4 shows a punch 200 for manufacturing the roofing shingle 150 of FIGS. 3A, 3B, according to some embodiments. The punch 200 has a rounded-barrel shape. The punch has a length 205 and a width 210. The length 205 corresponds to the length 160 (FIG. 3A) and the width 210 to the width 165 (FIG. 3A) of the plurality of barrel-shaped indentations 155 (FIG. 3A). A height 215 of the punch 200 corresponds to the depth 170 (FIG. 3B).

Figure 5A:
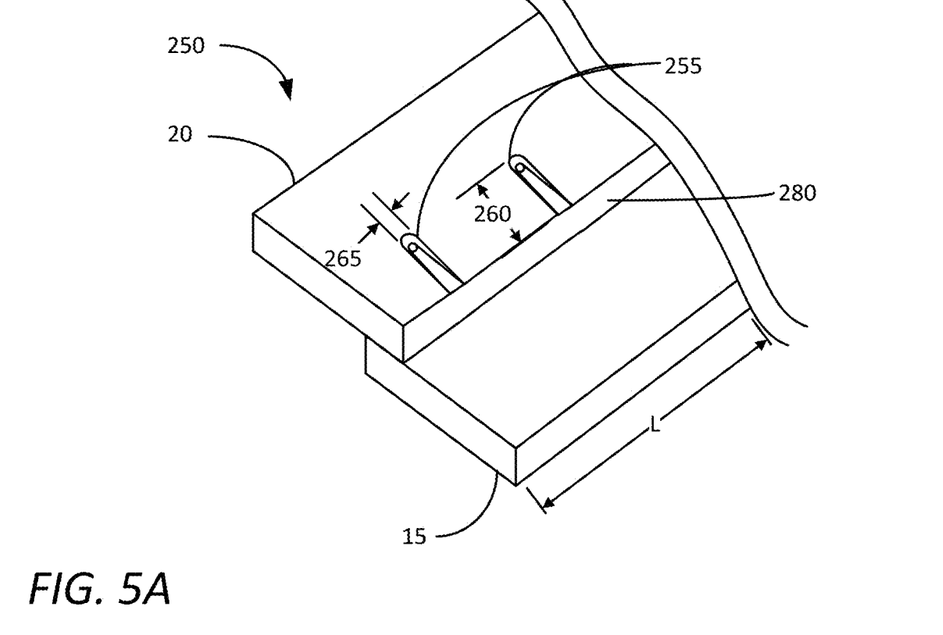
FIG. 5A shows a portion of a roofing shingle, according to some embodiments.
Figure 5B:
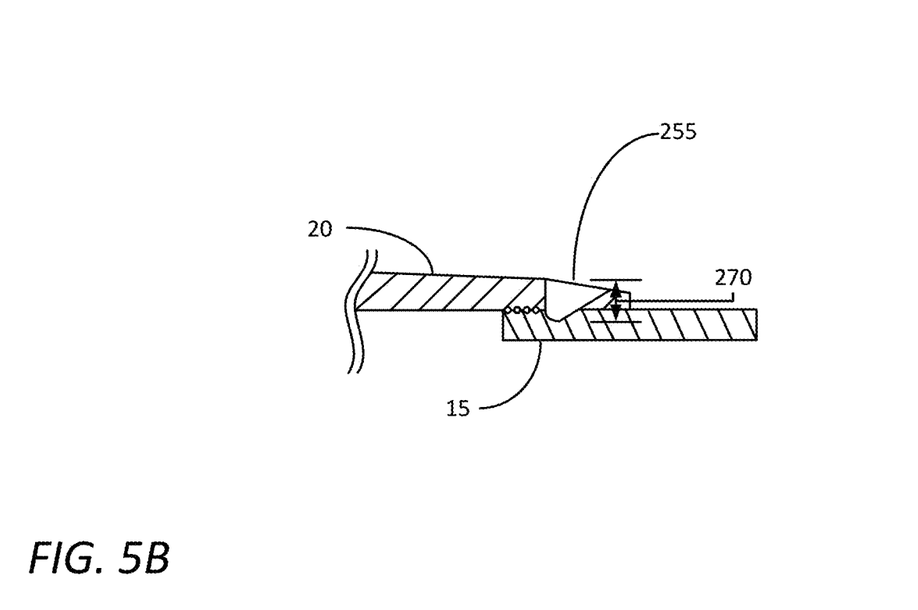
FIG. 5B shows a sectional view of the roofing shingle of FIG. 5A, according to some embodiments.

FIG. 5A shows a roofing shingle 250, according to some embodiments. FIG. 5B shows a sectional view of the roofing shingle 250, according to some embodiments. FIGS. 5A-5B will be discussed generally, unless specific reference is made otherwise.

The roofing shingle 250 includes a plurality of flattened teardrop shaped indentations 255. The plurality of flattened teardrop shaped indentations 255 are spaced along the major dimension L of the roofing shingle 250. The roofing shingle 250 includes the first layer 15 and the second layer 20. The plurality of flattened teardrop shaped indentations 255 have a length 260 and a width 265. A depth 270 is such that a portion of the second layer 20 is indented into the first layer 15, without piercing through the first layer 15. The depth 270 is shallower at an edge 280 of the second layer 20 than spaced from the edge 280. That is, the depth 270 varies due to the flattened teardrop shape. In the illustrated embodiment, the plurality of flattened teardrop shaped indentations 255 are adjacent to the edge 280 of the second layer 20.

Figure 6:
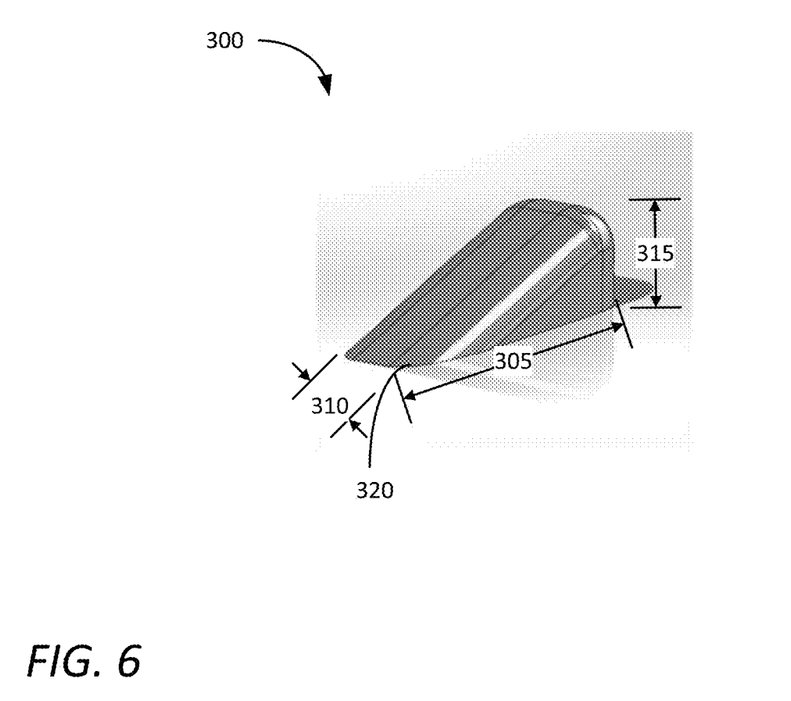
FIG. 6 shows a punch for manufacturing the roofing shingle of FIGS. 5A, 5B, according to some embodiments.

FIG. 6 shows a punch 300 for manufacturing the roofing shingle 250 of FIGS. 5A, 5B, according to some embodiments. The punch 300 has a flattened teardrop shape. The punch has a length 305 and a width 310. The length 305 corresponds to the length 260 (FIG. 5A) and the width 310 to the width 265 (FIG. 5A) of the plurality of flattened teardrop shaped indentations 255 (FIG. 5A). A height 315 of the punch 300 corresponds to the depth 270 (FIG. 5B). The punch 300 has a radius 320. In some embodiments, the radius 320 is at or about 0.06 inches.

Figure 7A:
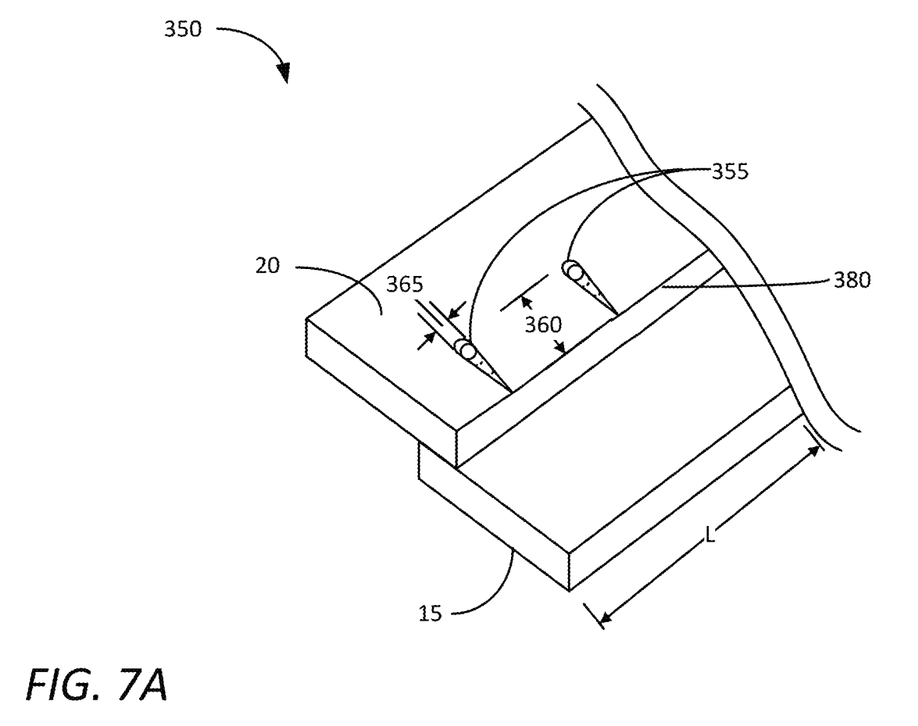
FIG. 7A shows a portion of a roofing shingle, according to some embodiments.
Figure 7B:
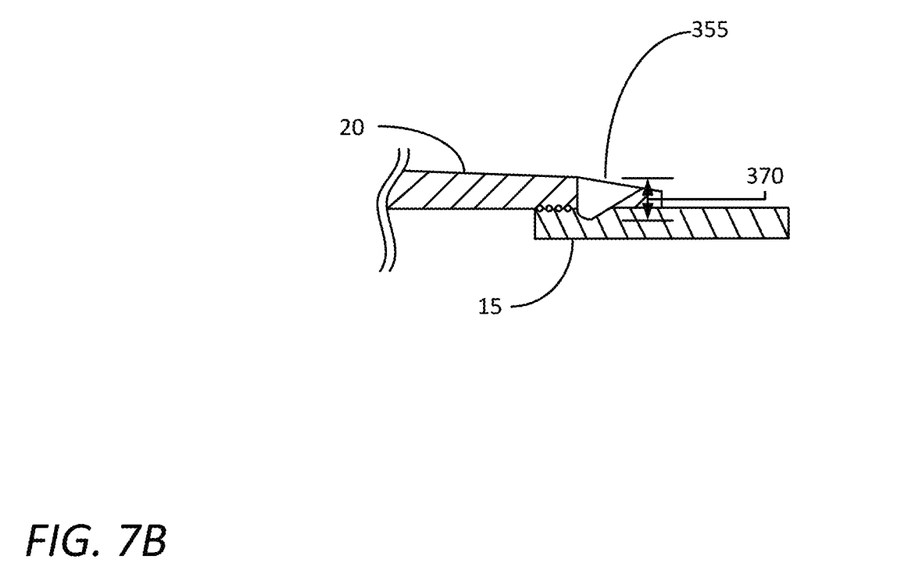
FIG. 7B shows a sectional view of the roofing shingle of FIG. 7A, according to some embodiments.

FIG. 7A shows a roofing shingle 350, according to some embodiments. FIG. 7B shows a sectional view of the roofing shingle 350, according to some embodiments. FIGS. 7A-7B will be discussed generally, unless specific reference is made otherwise.

The roofing shingle 350 includes a plurality of rounded taper teardrop shaped indentations 355. The plurality of rounded taper teardrop shaped indentations 355 are spaced along the major dimension L of the roofing shingle 350. The roofing shingle 350 includes the first layer 15 and the second layer 20. The plurality of rounded taper teardrop shaped indentations 355 have a length 360 and a width 365. As shown, the width 365 tapers toward an edge 380 such that the width is relatively smallest adjacent the edge 380 (i.e., narrower at the edge 380). A depth 370 is such that a portion of the second layer 20 is indented into the first layer 15, without piercing through the first layer 15. The depth 370 is shallower at the edge 380 of the second layer 20 than spaced from the edge 380. That is, the depth 370 varies due to the rounded taper teardrop shape. In the illustrated embodiment, the plurality of rounded taper teardrop shaped indentations 355 are formed adjacent to the edge 380 (i.e., not spaced).

Figure 8:
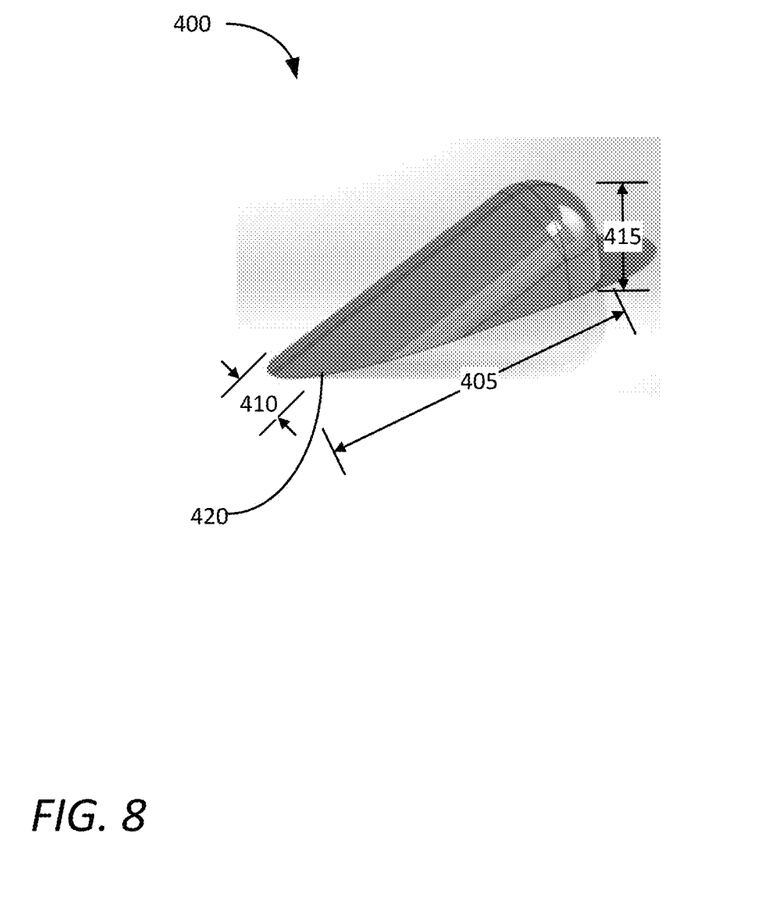
FIG. 8 shows a punch for manufacturing the roofing shingle of FIGS. 7A, 7B, according to some embodiments.

FIG. 8 shows a punch 400 for manufacturing the roofing shingle 350 of FIGS. 7A, 7B, according to some embodiments. The punch 400 has a rounded taper teardrop shape. The punch has a length 405 and a width 410. The length 405 corresponds to the length 360 (FIG. 7A) and the width 410 to the width 365 (FIG. 7A) of the plurality of rounded taper teardrop shaped indentations 355 (FIG. 7A). A height 415 of the punch 400 corresponds to the depth 370 (FIG. 7B). The punch 400 has a radius 420. In some embodiments, the radius is at or about 0.04 inches.

Figure 9:
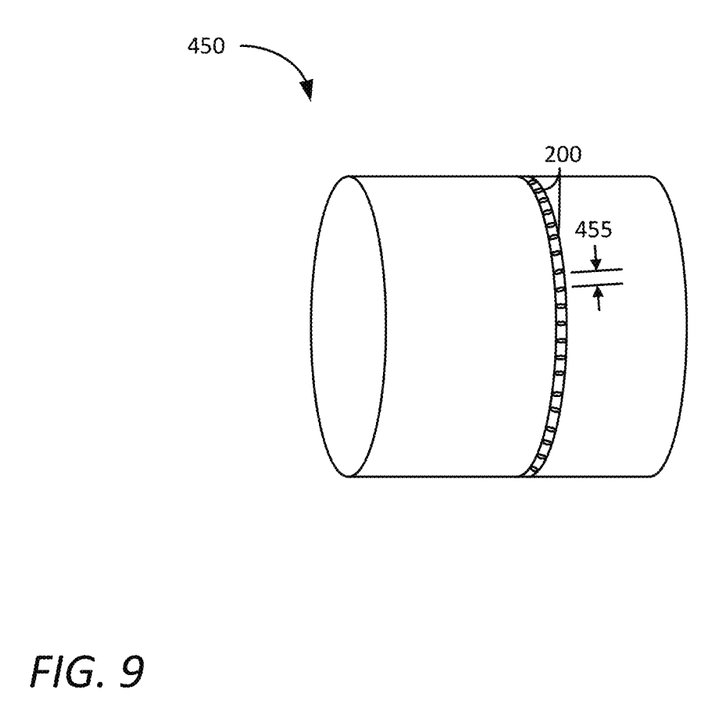
FIG. 9 shows a wheel used to manufacture a roofing shingle, according to some embodiments.

FIG. 9 shows a wheel 450 used to manufacture an article such as the article 10 (FIGS. 1A-1C) or the roofing shingles 150, 250, 350 (FIGS. 3A, 3B, 5A, 5B, 7A, 7B), according to some embodiments. In the illustrated embodiment, the wheel 450 include a plurality of punches 200. It is to be appreciated that the punches 200 are an example. In some embodiments, the punches 200 on the wheel 450 can be replaced by the punch 300 or the punch 400. In some embodiments, the wheel 450 can include a combination of punches 200, 300, or 400.

In some embodiments, the punches 200 can be spaced 455 at or about 1 inch apart. In some embodiments, the punches 200 can be spaced from at or about 0.5 inches to at or about 2 inches apart. It is to be appreciated that the spacing between the punches 200 can vary according to a spacing of indentations on the article.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the embodiments that follow.

What is claimed is:

1. A roofing shingle, comprising:
   a first layer including a front surface and a back surface;
   a second layer including a front surface and a back surface,
      wherein a portion of the second layer overlaps the first layer,
      wherein a portion of the second layer is fastened to the first layer,
      wherein the back surface of the first layer contacts the front surface of the second layer; and
   a plurality of indentations,
      wherein a major dimension of each indentation is oriented along a minor dimension of the roofing shingle,
      wherein the plurality of indentations partially presses the second layer into the first layer such that the second layer is partially indented into the first layer.

2. The roofing shingle of claim 1, wherein the first layer is a dragon tooth layer and the second layer is a backer layer.

3. The roofing shingle of claim 1, comprising an adhesive between the first layer and the second layer.

4. The roofing shingle of claim 1, wherein the plurality of indentations have a depth of 0.05 to 0.2 inches.

5. The roofing shingle of claim 1, wherein the plurality of indentations comprise a flattened teardrop shape and have a depth of 0.1 inches.

6. The roofing shingle of claim 1, wherein the plurality of indentations comprise a rounded taper teardrop shape and have a depth of 0.1 inches.

7. The roofing shingle of claim 1, wherein the first layer comprises a fines stripe disposed on the front surface of the first layer.

8. The roofing shingle of claim 1, wherein the plurality of indentations taper such that the plurality of indentations are narrower at an end thereof.

9. The roofing shingle of claim 1, wherein the plurality of indentations comprises a cylindrical shape.

10. The roofing shingle of claim 1, wherein the plurality of indentations comprises a flattened teardrop shape.

11. The roofing shingle of claim 1, wherein the plurality of indentations comprises a rounded taper teardrop shape.

12. A roofing shingle, comprising:
    a first layer including a front surface and a back surface;
    a second layer including a front surface and a back surface, wherein the second layer comprises a backer layer,
       wherein a portion of the second layer overlaps the first layer,
       wherein a portion of the second layer is fastened to the first layer,
       wherein the back surface of the first layer contacts the front surface of the second layer; and
    a plurality of indentations each having a major dimension oriented along a minor dimension of the roofing shingle,
       wherein the plurality of indentations presses the second layer into the first layer such that the second layer is partially indented into the first layer.

13. The roofing shingle of claim 12, wherein the first layer comprises a fines stripe disposed on the front surface of the first layer.

14. The roofing shingle of claim 13, comprising an adhesive between the first layer and the second layer.

15. The roofing shingle of claim 14, wherein the first layer comprises a fines stripe disposed on the front surface of the first layer.

16. The roofing shingle of claim 12, wherein the plurality of indentations taper such that the plurality of indentations are narrower at an end thereof.

17. The roofing shingle of claim 12, wherein the plurality of indentations comprises a cylindrical shape.

18. The roofing shingle of claim 12, wherein the plurality of indentations comprises a flattened teardrop shape.

19. The roofing shingle of claim 12, wherein the plurality of indentations comprises a rounded taper teardrop shape.

20. The roofing shingle of claim 12, wherein the first layer comprises a paint line disposed on the front surface of the first layer.

\* \* \* \* \*